United States Patent Office 3,511,750
Patented May 12, 1970

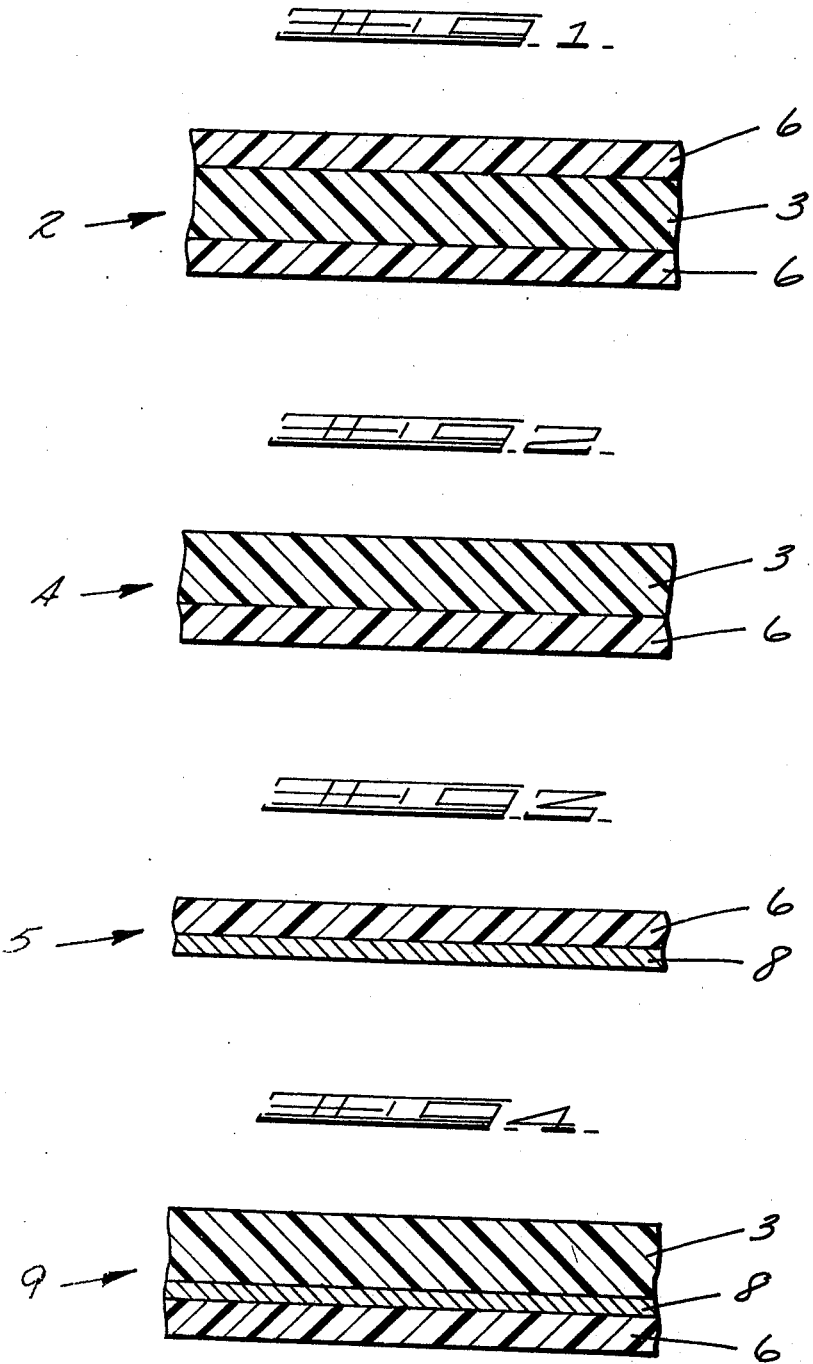

3,511,750
LAMINATES INCLUDING PULP-THERMOPLASTIC
BOARDS
Shibley A. Hider, Toledo, Ohio, assignor to Owens-
Illinois, Inc., a corporation of Ohio
Filed Oct. 20, 1965, Ser. No. 498,680
The portion of the term of the patent subsequent
to June 13, 1984, has been disclaimed
Int. Cl. B32b 27/04, 29/06
U.S. Cl. 161—216                                    6 Claims

ABSTRACT OF THE DISCLOSURE

Laminates are disclosed in which at least one layer is formed from a pulp-thermoplastic hybrid composition, which layer is fused by heat to an adjacent layer. The adjacent layer can be paper, metal, polymeric material or a pulp-thermoplastic resin hybrid composition in which the thermoplastic resins of the layers are noncompatible.

This invention is concerned with composition boards. More specifically, this invention is concerned with hybrid composition boards that are formed from two or more layers of different pulp-thermoplastic boards to produce products having the advantageous physical properties of each layer. The invention also encompasses the bonding of pulp-thermoplastic boards to paper-like products, polymeric sheets and metals.

Pulp-thermoplastic boards which are formed from a wood pulp and a thermoplastic are known in the prior art. These prior art pulp-thermoplastic boards are usually produced by the blending of a thermoplastic or thermosetting resin with a wood pulp. This invention is adapted to the utilization of these prior art composition boards. This invention is also adapted to utilize pulp-thermoplastic boards that are produced by the blending of a particulate thermoplastic with cellulose fibers that have been fibrillated. These fibrillated compositions will be described in detail herein below.

It is the object of this invention to produce a composite composition board of superior properties which utilizes at least one pulp-thermoplastic board.

Pulp-thermoplastic boards differ widely in their physical properties according to the pulp and thermoplastic utilized. For example, some pulp-thermoplastic boards exhibit exceptional stiffness, some exhibit exceptional strength, etc. According to this invention, these boards of varying physical properties are combined to produce a product of combined but superior physical properties such as wet strength, flexibility, stiffness, etc. In accordance with this invention a superior composition board can be produced which utilizes a plurality of thermoplastic resins which are otherwise noncompatible. Likewise, in accordance with this invention, superior composition boards are produced by the combination of a pulp-thermoplastic board with at least one of a paper-like product, a polymeric sheet or a metal sheet or foil.

The composition board of the subject invention is generally illustrated in FIGS. 1 through 4.

FIGS. 1 and 4 show embodiments 2 and 9 of this invention wherein a central member is bonded to two other pulp-thermoplastic boards.

FIGS. 2 and 3 represent other embodiments 4 and 5 of this invention wherein one pulp-thermoplastic board is bonded to a base member.

To be more specific, the composite composition board structure as is illustrated in FIG. 1 comprises a central pulp-thermoplastic board 3 to which is bonded two other pulp-thermoplastic boards 6 of differing physical properties.

In the embodiment of the invention at hand, as is illustrated in FIG. 2, a composite composition board comprises a pulp-thermoplastic board 3 which is bonded to another pulp-thermoplastic board 6 of differing physical properties.

The composition board 5 as is illustrated in FIG. 3 utilizes a single pulp-thermoplastic board 6 to which is bonded a layer 8 which may be a paper-like layer, a plastic sheet or a metal. Sheet 8 will be described in detail herein below. Likewise, in composition board 9, as is illustrated in FIG. 4, two pulp-thermoplastic boards 3 and 6 may be combined with a layer 8.

Pulp-thermoplastic board layers 3 and 6 are formed from a mixture of at least one cellulosic material and at least one thermoplastic material. Examples of cellulose materials which are adapted to this phase of the subject invention include wood cellulose and pulps derived from hardwoods, softwoods and woody annular plants such as balsam fir, eastern hemlock, jack pine, eastern white pine, red pine, black spruce, red spruce, white spruce, tamarack, cyprus, quaking aspen, American beech, paper birch, yellow birch, eastern cottonwood, sugar maple, silver maple, yellow poplar, black cherry, white oak, bagasse, hemp, cotton and jute; mixtures of cellulosic materials can also be used. Preferred pulps adapted for the preparation of pulp-thermoplastic boards 3 and 6 are softwood pulps produced from woods such as pine, spruce, etc. No special prior refining is necessary for the pulps to be used in the practice of the present invention. The pulp-particulate thermoplastic mixture can contain from about 10 to about 80 weight percent pulp. A more preferred range for pulp concentration is from about 40 to about 60 weight percent with a most preferred percentage being 50 weight percent. Mixtures of cellulosic materials can also be utilized.

The above-described pulps are blended with from about 20 to about 90 weight percent of a thermoplastic material. A more preferred fiber-thermoplastic mixture contains from about 40 to about 60 weight percent of a particulate thermoplastic material with a most preferred composition containing 50 weight percent of a particulate thermoplastic material. Examples of thermoplastics which are suited for use in this phase of the subject invention include both homopolymeric and copolymeric resins, such as (1) vinyl resins formed by the polymerization of vinyl halides or by the copolymerization of vinyl halides with unsaturated polymerizable compounds, e.g., vinyl esters, α,B-unsaturated esters, α,B-unsaturated ketones, α,B-unsaturated aldehydes and unsaturated hydrocarbons such as butadienes and styrenes; (2) poly-α-olefins, such as polyethylene, polypropylene, polybutylene, polyisoprene and the like, including copolymers of poly-α-olefins; (3) polyurethanes such as are prepared from polyols and organic polyisocyanates; (4) polyamides such as polyhexamethylene adipamide; (5) polyesters such as polymethylene terephthalates; (6) polycarbonates; (7) polyacetals; (8) polyethyene oxide; (9) polystyrene, including copolymers and terpolymers of styrene with monomeric compounds such as acrylonitrile and butadiene; (10) acrylic resins as exemplified by the polymers of methyl acrylate, acrylamide, methylol acrylamide, acrylonitrile, and copolymers of these with styrene, vinyl pyridines, etc.; (11) neoprene; (12) condensates of aldehydes, especially formaldehyde and formaldehyde engendering substances such as paraformaldehyde; (13) silicones such as dimethyl and methyl hydrogen polysiloxanes; (14) unsaturated polyesters; and (15) cellulose esters including the nitrate, acetate, propionate, etc. This list is not meant to be limiting or exhaustive but merely to illustrate the wide range of polymeric materials which may be employed in the present invention.

Preferred thermoplastic polymers adapted for use in this invention are generally of low polarity and density. Examples of these preferred polymers are hydrophobic polymers such as those derived from olefinic hydrocarbons having from one to twelve carbon atoms, homopolymers and copolymers of ethylene, propylene, 1-butene, nylon, styrene, vinyl chloride, polybutadiene, and polyisoprene. However, the thermoplastic can be low density or high density, low molecular weight or high molecular weight, and low melting or high melting. Mixtures of polymers can also be used.

Sheet 8 can comprise any paper-like product. Examples of paper and paper-like products which are adapted to function as an inner layer member are kraft pine liner, corrugated media, bleached kraft pine, bleached hardwood, etc.

Sheet 8 can also comprise a polymer such as (1) vinyl resins formed by the polymerization of vinyl halides or by the copolymerization of vinyl halides with unsaturated polymerizable compounds, e.g., vinyl esters, α,B-unsaturated acids, α,B-unsaturated esters, α,B-unsaturated ketones, α,B-unsaturated aldehydes and unsaturated hydrocarbons such as butadienes and styrenes; (2) poly-α-olefins such as polyethylene, polypropylene, polybutylene, polyisoprene and the like, including copolymers of poly-α-olefins; (3) polyurethanes such as are prepared from polyols and organic polyisocyanates; (4) polyamides such as polyhexamethylene adipamide; (5) polyesters such as polymethylene terephthalates; (6) polycarbonates; (7) polyacetals; (8) polyethylene oxide; (9) polystyrene, including polymers of styrene with monomeric compounds such as acrylonitrile and butadiene; (10) acrylic resins as exemplified by the polymers of methyl acrylate, acrylamide, methylol acrylamide, acrylonitrile, and copolymers of these with styrene, vinyl pyridines, etc.; (11) neoprene; (12) condensates of aldehydes, especially formaldehyde and formaldehyde engendering substances such as paraformaldehyde; (13) modified and unmodified condensates of hydroxy benzenes like phenol, resorcinol, etc., with the aforementioned aldehydes; (14) silicones such as dimethyl and methyl hydrogen polysiloxanes; (15) unsaturated polyesters; and (16) cellulose esters including the nitrate, acetate, propionate, etc. This list is not meant to be limiting or exhaustive but merely to illustrate the wide range of polymeric materials which may be employed in the formation of sheet 8.

Finally, sheet 8 can be a metal sheet or foil such as iron, aluminum, lead, zinc, nickel, copper, chrome, silver, gold, etc.

Preferred composition boards 3 and 6 in accordance with the embodiments with this invention as are illustrated in FIGS. 1 and 2 are prepared by the combination of at least one board 6, that is formed from about 40 to 60 percent kraft pulp and from about 40 to about 60 percent polyethylene with another board 3, that comprises from about 40 to about 60 percent kraft pulp and from about 40 to about 60 percent of either polystyrene or polyvinyl chloride.

The preferred embodiment 5 of this invention as is illustrated by FIG. 3, comprises a pulp-thermoplastic board 6 which comprises from about 40 to about 60 percent kraft pulp and from about 60 to about 40 percent polyethylene. To this pulp-thermoplastic board is bonded a liner 8 which is kraft paper.

The preferred structure for the embodiment 9, as is illustrated by FIG. 4, comprises a pulp-thermoplastic sheet 6, which is formed from about 40 to about 60 percent kraft pulp and from about 60 to about 40 percent polyethylene. This sheet is bonded to a liner 8 which is kraft paper, which is in turn bonded to another pulp-thermoplastic board 4, which is formed from about 40 to about 60 percent kraft pulp and from about 60 to about 40 percent of either polystyrene or polyvinyl chloride.

The above-described pulps and thermoplastics can be combined to form pulp-thermoplastic board layers 3 and 6 by many methods. For example, a powdered thermoplastic can be blended with a dry pulp and subsequently fused by the application of heat and pressure. Likewise, a dry pulp can be kneaded into a thermoplastic material which is in a semi-plastic state. The thermoplastic material can also be blended into a slurry which comprises a pulp and a slurry media, dried and fused.

As mentioned above, superior pulp-thermoplastic board can be prepared by the beating of a slurry which comprises a particulate thermoplastic material, pulp and a slurry media. This beating effects the fibrillation of the pulp and the entrapment of the particulate thermoplastic material. When using this fibrillation technique to produce a pulp-thermoplastic board, the thermoplastic is in a particulate form and should range in size between 40 and 300 mesh. Within the useful range of 40 to 300 mesh, there is a preferred range of 100 to 200 mesh.

Liquid slurry media which are adapted for use to produce the pulp-thermoplastic board using fibrillation include for example, hydrocarbons, such as benzene, toluene, and heptane; mildly polar substances, for example, ethers such as ethyl ether and tetrahydrofuran; ketones such as 2-butanone; and highly polar solvents, for example, hydroxy compounds such as water, methanol, and ethanol. Although convenience determined by routine test will usually establish the preferred medium in a particular application, the only substantial limitation on the medium is that it must not decompose or completely dissolve the cellulosic or the thermoplastic component under the conditions selected. Non-aqueous media which meet this requirement are suitable, but aqueous media have practical advantages because of their lower cost and customary use in the art for paper-making processes.

The fibrillation necessary to produce the preferred pulp-thermoplastic boards for use in this invention is that which provides a decrease of TAPPI freeness value of the pulp alone of at least 25 ml. below the freeness value prior to treatment, and provides a final TAPPI freeness value of the pulp alone of from about 300 ml. to about 600 ml. A perfered range for the final value of the pulp is a TAPPI freeness of from about 375 ml. to about 425 ml. It is to be noted that the freeness of the resulting mixture can also be measured. However, these values are usually slightly higher due to the effect of the particulate thermoplastic. When measuring the freeness of the composite mixture, the preferred final freeness falls within the range of from about 425 ml. to about 475 ml.

It will be apparent from the foregoing that not all types of agitation are applicable to provide the fibrillation necessary to obtain the products of the present invention. The degree of fibrillation suitable for the practice of this invention, however, can be defined in terms of the TAPPI freeness or Williams slowness. Specifications for the TAPPI test T 227 m–58. "Freeness of Pulp," as revised August 1958, are available from the Technical Association of the Pulp and Paper Industry, 360 Lexington Ave., New York 17, N.Y. The test is based on a measurement of rate of water drainage from a standardized pulp suspension through a perforated plate. The filtrate enters a funnel which is equipped with side and bottom orifices; the quantity of water which is collected from the side orifice is a measure of drainage rate, and this quantity in milliliters is TAPPI freeness. Tests for the present invention were made on a Williams Precision Freeness Tester (Williams Apparatus Co., Watertown, N.Y.), which allows measure of drainage time rather than volume. Values from the two freeness tests are interconvertible by scales available from TAPPI at the address given above.

The fibrillation as described above is carried out on a slurry that is formed between a fiber-particulate thermoplastic mixture and a liquid medium as described above. As is mentioned, aqueous media are preferred for use in this invention.

The slurry concentration can range from about 0.01 to about 2 percent. A preferred range is from about 0.5 to about 1 percent. Generally, the slurry should be of such a consistency, that it is possible to form a paper-like sheet on a conventional paper making machine such as a Fourdrinier.

Upon formation of the fibrillated fiber-particulate thermoplastic mixture as described above, said mixture is fed directly into a conventional paper making machine such as a Fourdrinier machine. The coating of particulate thermoplastic on the fibrillated fibers is such that it is still possible to form fiber-to-fiber contact. Because of this fiber-to-fiber contact, a wet sheet of suitable strength to allow the use of a conventional paper making machine can be formed. The wet sheet upon formation can be dried with the dryers that are used to dry conventional paper. It is recognized by one skilled in the art, the temperature of the dryers and feed speed must be adjusted to cause the drying of the wet sheet. Upon drying, the sheet is formed into a finished product by the addition of heat and/or pressure.

The above-described preferred pulp-thermoplastic boards, which are produced by fibrillation are described in detail in U.S. patent application, Ser. No. 487,082, filed Sept. 13, 1965, now abandoned, having an assignee that is common with the assignee of this invention.

Upon formation, the above-described pulp-thermoplastic boards, paper-like sheets, polymeric sheets and metal sheets or foils are formed into the composition boards of this invention by the application of at least one of heat and pressure. In the production of these composition boards 2 and 4 as are illustrated in FIGS. 1 and 2, the individual pulp-thermoplastic boards 3 and 6 may be combined in an unfused state. Likewise, the individual pulp-thermoplastic boards may be fused by the exposure to a temperature of from about 250 to about 500° F. at a pressure of from about 50 to about 1000 p.s.i.g. prior to their combination with the other pulp-thermoplastic board. Also an unfused pulp-thermoplastic board may be fused with a fused pulp-thermoplastic board.

In the structures 5 and 9, as is illustrated by FIGS. 3 and 4, pulp-thermoplastic boards 6, may be combined with sheet 8 in a fused or unfused state.

In regard to the above-described fabricating techniques, it should be noted that it is preferred that when two or more pulp-thermoplastics are to be combined, they be in an unfused state. This procedure produces a superior bond between the various pulp-thermoplastic sheets. While the applicant is not sure, it is thought that this superior bond results due to the migration of some of the thermoplastic from each pulp-thermoplastic board into that of the adjacent sheet.

It is within the purview of this invention to add to the compositions of this invention compatible materials which do not affect the basic and novel characteristics of the composition of this invention. Among such materials are coloring agents, including dyes and pigments, fillers and similar additives. Additives such as antioxidants, antistatic agents, stabilizers and anti-foaming agents, may also be added. The upper limit of the quantity of additives is usually about 25 weight percent of the product.

It is to be noted that upon production of the finished fused material of this invention, said material is in sheet form. This sheet can then be corrugated, heat sealed, sealed with adhesives, formed into a container, etc. Likewise, the unfused pulp-thermoplastic mixture after drainage, can be fused into any shaped article by addition of heat and/or pressure.

The composition boards of this invention can be manufactured on a continuous or batch basis. If the preferred fibrillation pulp-thermoplastic board is utilized and said sheet is manufactured on a Fourdrinier paper making machine the board from the Fourdrinier machine can be easily combined with the other components of the product composition board on a continuous basis.

The following examples will illustrate the invention. These examples are given for the purpose of illustration and not for the purpose of limiting this invention.

EXAMPLE I

A 2-mil sheet of low density polyethylene (density .916; melt index—2) was sandwiched between two unfused pulp-thermoplastic boards containing 60% low density polyethylene and 40% unbleached pine kraft pulp. The composite was fused for 2 minutes at 300° F. and 300 p.s.i. on a Carver press. The fused composition board exhibited improved moisture vapor barrier properties as compared to the pulp-thermoplastic board alone.

EXAMPLE II

A 6-mil polyvinyl chloride film (K6–0601 produced by Columbus Coated Fabric Company) was sandwiched between two unfused pulp-thermoplastic boards containing 60% high density polyethylene (density .960; melt index—14) and 40% unbleached pine kraft pulp. The composite was fused for 1 minute at 350° F. and 300 p.s.i. on a Carver press. The fused composite exhibited improved moisture vapor and organic solvent barrier properties as compared with the pulp-thermoplastic board alone.

EXAMPLE III

A sandwich of unfused pulp-thermoplastic board was prepared with two outer sheets consisting of 60% low density polyethylene (density .916; melt index—2) and 40% kraft pulp. The inner board consisted of 60% polystyrene (density 1.05) and 40% unbleached pine kraft pulp. The sandwich was then fused on a Carver press for 2 minutes at 350° F. and 300 p.s.i. to yield a single fused composite sheet. The outer pulp-polyethylene sheets lend flexibility to the stiff and somewhat brittle central member of pulp-polystyrene.

EXAMPLE IV

A sheet of 2-mil aluminum foil was sandwiched between two unfused pulp-polystyrene boards which were formed from 40% unbleached kraft; 60% polystyrene (density 1.05). This 3-ply composite was fused for 10 seconds at 500° F. and a pressure of over 1000 p.s.i. on a continuous laminator. The resulting composition board exhibited structural properties which were superior to those of the aluminum foil alone and barrier property which was superior to those of the pulp-polystyrene boards.

EXAMPLE V

A sheet of unbleached pine kraft pulp (42 lbs./1000 sq. ft.) was sandwiched between two sheets of unfused pulp-thermoplastic containing 60% low density polyethylene (density .916; melt index—2) and 40% unbleached pine kraft pulp. The composite was fused on a continuous laminator for 20 seconds at 500° F. and a pressure of over 1000 p.s.i. A completely fused composition board resulted having excellent barrier properties due to the pulp-thermoplastic outer plies, and improved stiffness due to the inner kraft sheet. The resulting composition board exhibited a stiffness which was greater than the same caliper of pulp-polyethylene board alone. The adhesion between pulp-polyethylene sheets and kraft sheet was such that the plies could not be delaminated without destroying the kraft sheet.

EXAMPLE VI

A composition board was produced from an unbleached pine kraft sheet and pulp-polyvinyl chloride boards which contain 40% pulp and 60% polyvinyl chloride (density 1.66). The composition board was prepared in the same manner as is described in Example V. Excellent adhesion of the pulp-polyvinyl chloride boards to kraft sheet was achieved at a pressure of over 1000 p.s.i.

EXAMPLE VII

A 2-ply composition board containing one pulp-thermosplastic board which was formed from 50% bleached hardwood, 50% high density polyethylene (density .960; melt index—14) with another pulp-thermoplastic board which was formed from 40% unbleached pine kraft, 60% polyvinyl chloride of density 1.66. The unfused boards were fused on a continuous press for 30 seconds at 500° F. at a pressure of over 1000 p.s.i. Excellent bonding was achieved between the two pulp-thermoplastic boards containing incompatible resins.

EXAMPLE VIII

A 2-ply composition board was prepared from an unfused pulp-thermoplastic board which contained 40% kraft pulp, 60% high density polyethylene (density .96) and an unfused pulp-thermoplastic board which contained 40% kraft pulp, 60% polystyrene (density 1.05) in a manner identical with Example VII. Excellent adhesion between the noncompatible pulp-thermoplastic boards was achieved.

EXAMPLE IX

A pulp-thermoplastic board containing 50% unbleached pine kraft pulp and 50% low density polyethylene (density .916; melt index—22) was laminated to kraft-lined aluminum foil (.0003″ thick) by means of heat (300° F.) and pressure (100 p.s.i. for 30 seconds, without use of adhesives. A composition board having the excellent barrier properties of aluminum and wet-strength properties of fused pulp-thermoplastic sheet was produced.

EXAMPLE X

An unfused pulp-thermoplastic board containing 40% unbleached pine kraft pulp and 60% high density polyethylene (density 0.960; melt index—14) was laminated on a continuous press to a 5½ mil polyvinyl chloride sheet (No. 9511—Columbus Coated Fabric). The polyvinyl chloride interpenetrated the pulp-polyethylene board so that the two plies were inseparable after fusion for 20 seconds at 500° F. and at a pressure of over 1000 p.s.i. If the pulp-thermoplastic ply were fused prior to lamination, the above conditions of time, temperature, and pressure resulted in a strong physical bond between the plies which could be peeled apart intact. The moisture vapor transmission rate of the composite was one half that of the same caliper pulp-polyethylene composition board alone.

EXAMPLE XI

The same procedure as in Example IX was used to fuse pulp-polystyrene, 40% unbleached kraft, 60% polystyrene (density 1.05) to a 6-mil polyvinyl chloride film (K6–0601—Columbus Coated Fabric). Again, a product which could not be separated into its components resulted. Likewise, the moisture vapor transmission rate was less than half that of pulp-polystyrene alone.

EXAMPLE XII

A fused sheet of pulp-thermoplastic containing 60% unbleached kraft pulp and 40% low density polyethylene (density 0.922; melt index—22) was laminated to a 6-mil sheet of low density polyethylene (density 0.912; melt index—2). Lamination was done a Carver press for 1 minute at 300° F. and 120 p.s.i. The low density polyethylene fused uniformly into the pulp-thermoplastic sheet to give a uniform surface layer of polyethylene which could not be separated without destroying the composite. In this way, improved abrasion resistance and moisture vapor and liquid barrier properties were imparted to the composite board by the polyethylene sheet, while the pulp-polyethylene sheet imparted stiffness to the resulting structure.

EXAMPLE XIII

An unfused sheet of pulp-thermoplastic containing 40% unbleached kraft pulp and 60% high density polyethylene (density 0.960; melt index—14) was fused by heat and pressure (1 minute, 350° F., 600 p.s.i.) to a sheet of 42 lb./1000 sq. ft. pine kraft pulp. Flow of plastic from the pulp-thermoplastic sheet into the porous kraft sheet resulted in excellent adhesion between the plies. The composite material which resulted showed a method for waterproofing the pulp sheet while improving the stiffness of the composite due to the higher stiffness of the paper sheet over the pulp-thermoplastic. No adhesive or pretreatment of the two substrates was required to effect bonding between the plies.

EXAMPLE XIV

A sheet of unfused pulp-thermoplastic containing 30% unbleached pine kraft pulp and 70% polyvinyl chloride (density 1.66) was laminated to a 14-mil sheet of 42 lb./1000 sq. ft. kraft pulp by means of a continuous press for 30 seconds at 500° F. and at a pressure of over 1000 p.s.i. The finished fused composition board could not be delaminated without destruction of the kraft sheet.

What is claimed is:

1. A laminated body comprised of at least two layers fused one to the other, at least one of said two layers consisting essentially of a pulp-thermoplastic hybrid composition formed of a homogeneous slurry from which the liquid slurry medium is removed, said homogeneous slurry prior to liquid slurry medium removal having a solids content of from about 0.01 to about 2 weight percent consisting essentially of a fibrillated pulp and a particulate synthetic polymeric thermoplastic, which will pass through a 40-mesh screen and be retained by a 300-mesh screen, wherein the slurry contains particulate synthetic polymeric thermoplastic material, the freeness of the pulp being decreased at least 25 ml. below the freeness value prior to treatment to a final value of from about 300 ml. to about 600 ml. in accordance with TAPPI test T227n–58.

2. A laminated body in accordance with claim 1 wherein the other layer of said two layers is a member selected from the group consisting of paper, metal, polymeric material, and a pulp-thermoplastic resin hybrid composition wherein said thermoplastic resins of said two layers are noncompatible.

3. A laminated body in accordance with claim 1 wherein said pulp-thermoplastic resin hybrid composition layer consists essentially of about 40 to about 60 percent kraft pulp and about 40 to about 60 percent polyethylene.

4. A laminated body in accordance with claim 2 wherein the other of said two layers consists essentially of kraft paper.

5. A laminated body in accordance with claim 2 wherein the other of said two layers consists essentially of a pulp-thermoplastic hybrid composition consisting essentially of about 40 to about 60 percent kraft pulp and from about 40 to about 60 percent of a member selected from the group consisting of polystyrene and polyvinyl chloride.

6. A laminated body in accordance with claim 3 wherein the other of said two layers consists essentially of a member selected from the group consisting of polyethylene, polyvinyl chloride, and aluminum foil.

References Cited

UNITED STATES PATENTS

| | | | |
|---|---|---|---|
| 1,919,697 | 7/1933 | Groff | 162—168 |
| 2,739,058 | 3/1956 | O'Flynn et al. | 162—169 |
| 3,157,566 | 11/1964 | Brafford | 162—183 XR |
| 3,173,829 | 3/1965 | Thier et al. | 162—183 XR |
| 3,325,345 | 6/1967 | Hider | 162—169 |

ROBERT F. BURNETT, Primary Examiner

R. H. CRISS, Assistant Examiner

U.S. Cl. X.R.

161—218, 220, 250, 251, 252, 268, 270